(12) United States Patent
Wu et al.

(10) Patent No.: US 7,476,426 B2
(45) Date of Patent: Jan. 13, 2009

(54) EVACUATED GLASS PANEL HAVING DEGASSING DEVICE

(75) Inventors: Jusheng Wu, Beijing (CN); Hongyan Li, Beijing (CN)

(73) Assignee: Boe Technology Group Co., Ltd., Beijing (CN)

( * ) Notice: Subject to any disclaimer, the term of this patent is extended or adjusted under 35 U.S.C. 154(b) by 552 days.

(21) Appl. No.: 10/526,834

(22) PCT Filed: Apr. 17, 2003

(86) PCT No.: PCT/CN03/00276

§ 371 (c)(1),
(2), (4) Date: Jul. 20, 2005

(87) PCT Pub. No.: WO2004/022899

PCT Pub. Date: Mar. 18, 2004

(65) Prior Publication Data

US 2005/0243451 A1    Nov. 3, 2005

(30) Foreign Application Priority Data

Sep. 5, 2002   (CN)   ................... 02 2 53523
Sep. 13, 2002  (CN)   ................... 02 2 53930

(51) Int. Cl.
   E06B 3/00    (2006.01)
   E06B 3/677   (2006.01)
   E06B 7/12    (2006.01)
   E04C 2/54    (2006.01)

(52) U.S. Cl. .................. 428/34; 52/172; 52/786.1; 52/786.13

(58) Field of Classification Search ............ 428/34; 52/786.1, 786.13, 172
   See application file for complete search history.

(56) References Cited

U.S. PATENT DOCUMENTS 5,657,607 A * 8/1997 Collins et al. ............ 52/786.13
5,664,395 A   9/1997 Collins et al.
5,891,536 A * 4/1999 Collins et al. ................ 428/34

* cited by examiner

*Primary Examiner*—Donald Loney

(57) ABSTRACT

An evacuated glass panel having a degassing device includes at least two planar glass sheets and support means disposed therebetween, an edge frame component sealed around the periphery of the planar glass sheets, and a degassing device disposed in the evacuated space of the evacuated glass panel. Between the degassing device and the groove, a low melting point glass powder layer is placed and sintered to fix the degassing device in the groove.

9 Claims, 1 Drawing Sheet

US 7,476,426 B2

EVACUATED GLASS PANEL HAVING DEGASSING DEVICE

TECHNICAL FIELD

The present invention relates to an evacuated glass panel having a degassing device and, particularly, to an evacuated glass panel having a degassing device disposed in an evacuated chamber of a thin evacuated glass panel. The present invention concerns the technical field of glass manufacturing.

An evacuated glass panel is a high thermo and sound insulating glass panel made by evacuation of the space between planar glass sheets of which the periphery is sealed.

The evacuated glass panel has been developed and manufactured through nearly a hundred years of investigation and development. It has been proved that an evacuated glass panel is an ideal thermo and sound insulating material that can be used in doors and windows of buildings and thermo-insulating cabinets, refrigerators or freezing cabinets in order to achieve higher thermo and sound insulating effect.

In order to increase the degree of evacuation people commonly employs a degassing device disposed in the space between planar glass sheets.

The degassing device is made from powder-particles of an alloy containing zirconium (Zr) and aluminum (Al) as main composition (84% Zr and 16% Al), pressed on a metal base.

After disposing the degassing device in the space between planar glass sheets of an evacuated glass panel, vaporization is activated by high frequency to form a fresh interface, which has a strong adsorption to remove the residual gas left in the evacuated space, thereby increasing the degree of evacuation and resistance to radiation of the evacuated glass panel.

However, in manufacturing evacuated glass panels having smaller thickness, the deposition of the degassing device between planar glass sheets becomes very difficult.

Because the space between planar glass sheets is very small, and the size of the degassing device is always larger than the space between planar glass sheets of an evacuated glass panel, the degassing device can not be placed in.

At present, the method for the placement of the degassing device in a thinner evacuated glass panel is to form a groove on the surface of the planar glass sheet of the evacuated glass panel for placing the degassing device.

The evacuated glass panel made by this method has greatly reduced its mechanical strength because at the time of groove forming, the stress around the groove is excessively concentrated, and at the same time a micro crack is easily occurred around the groove. When the degassing device is heated to high temperature, the micro crack may further spread. The micro crack and the concentration of stress may lead to fracture of the evacuated glass panel during manufacture process or practical use. Therefore, the concentration of stress and occurrence of micro cracks greatly decrease the mechanical strength of the evacuated glass panel.

In addition, because the air discharge hole of a traditional evacuated glass panel is sealed by a small pump-out tube through solder glass (a low melting point glass powder) soldered in the air discharge hole, the end of the pump-out tube has to be heated to melt and close the tube to seal the air discharge hole. Because the hole sealing place is protruded from the planar glass sheet, further treatment is necessary. If a mechanic cap or a sealing layer is added, the structure for sealing the air discharge hole is rather complex, and many operations are necessary. In some case the solder glass sealing piece is used to seal the air discharge hole. However, in order to insure absence of air leak in the air discharge hole, the solder glass sealing piece is protruded from the planar glass sheet after it is melted. Because the sealing place of the air discharge hole is uneven after its sealing, the sealing place is easy to be damaged and may result in air leak during assembling and transporting the evacuated glass panel, thereby losing the thermo and sound-insulating effect of the evacuated glass panel.

SUMMARY OF THE INVENTION

The main object of the present invention is to overcome the above problem of disposing a degassing device during the production process of an evacuated glass panel by providing an evacuated glass panel having a degassing device. The evacuated glass panel having a degassing device not only resolves the problem of difficulty in disposing a degassing device, particularly within an evacuated glass panel having smaller thickness, but also effectively avoids or greatly reduces the inner stress and micro cracks at the place of the degassing device.

A further object of the present invention is to overcome the above drawbacks in operation complexity and easy air leak by providing an evacuated glass panel having a degassing device with an even sealing surface at the air discharge hole to effectively prevent the problem of a traditional protruded sealing surface that is easily damaged to cause air leak.

An evacuated glass panel having a degassing device of the present invention includes at least two planar glass sheets and support means disposed therebetween. An edge frame component is used to seal around the periphery of the planar glass sheet, and the degassing device is disposed in the evacuated space of the evacuated glass panel. The degassing device is placed in the groove opened on the inner surface of the planar glass sheet. Between the degassing device and the groove a low melting point glass powder layer is placed to fix and joint the degassing device to the groove.

In one embodiment, the groove is opened on the inner surface at the same position of each of the two planar glass sheets and the low melting point glass powder layer is applied in the groove.

The degassing device is simultaneously inserted into the groove on the inner surface at the same position of each of the two planar glass sheets, and fixed and joined with the groove through the low melting point glass powder layer fixed and joined.

In another embodiment, the planar glass sheet has a sealing piece inserted on its outer surface for sealing the air discharge hole. Around the periphery of the air discharge hole at the outer surface of the planar glass sheet a concave portion is opened for inserting the sealing piece. The sealing piece is used to melt and joint with the concave portion to close the air discharge hole through the low melting point glass powder layer.

The sealing piece has a thickness corresponding to the depth of the concave portion. A groove is opened on the inner surface of another planar glass sheet at the position corresponding to the air discharge hole. When the degassing device is inserted into the air discharge hole, the bottom end of the degassing device is fixed in the groove. The top end of the degassing device is fixed and jointed with the sealing piece by the low melting point glass powder layer which is formed through sintering the low melting point glass powders.

In the present invention, the low melting point glass powder is applied in the groove in which the degassing device is fixed, and after sintering it becomes a low melting point glass powder layer. This scheme can insure that further increasing degree of evacuation will not create stress concentration and micro cracks on the evacuated glass panel because of the existence of the low melting point glass powder layer.

Because the degassing device is sintered to the groove of the planar glass, and the low melting point glass powder has thermal conductivity far lower than that of glass, the instantaneous heating of the degassing device does not exert a very large impact to the glass panel, and therefore the yield of the qualitatively finished product is greatly improved.

In addition, in the present invention because the air discharge hole can be used for placing the degassing device, this makes it possible to form a rather shallow groove at the inner surface of the bottom planar glass sheet. As a result, the mechanic strength of the evacuated glass panel, specially the evacuated glass panel of thin type, greatly increased. Moreover, because the sealing piece is even with the surface of the glass panel after sealing the air discharge hole, the risk of air leak due to damage of the air discharge hole is greatly reduced in the following assembling process or practical use.

BEST MODE FOR CARRYING OUT THE INVENTION

The present invention will be described in more detail by way of embodiments with reference to the accompanied drawings as follows.

EXAMPLE 1

Figure 1:
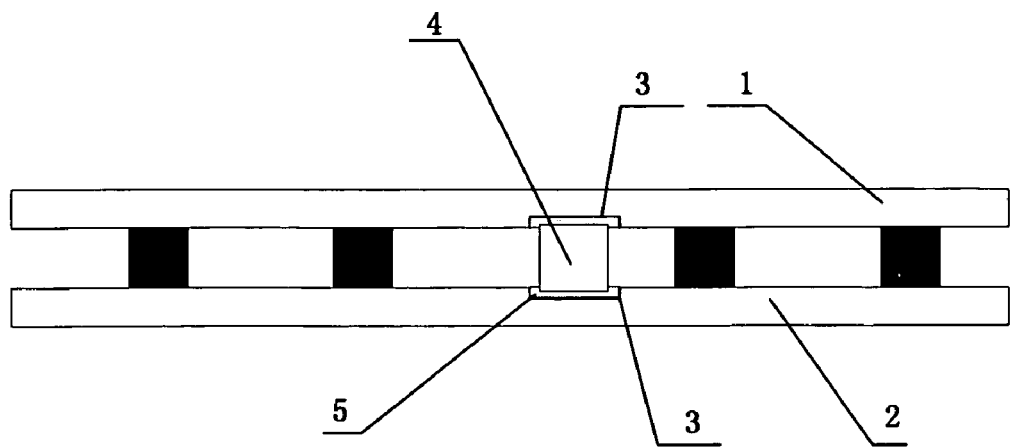
FIG. 1 is a schematic cross sectional view of an embodiment according to this invention.

As shown in FIG. 1, on the inner surface of top planar glass sheet 1 and bottom planar glass sheet 2 two grooves 3 are simultaneously opened, and the degassing device 4 is placed in the groove 3, thereby increasing the degree of evacuation and radiation resistance. The two simultaneously opened grooves avoid the difficulty of creating the small space of the evacuated chamber. The low melting point glass powder is firstly applied in the groove 3 and then the degassing device is placed. After sintering, the low melting point glass powder is solidified to form a low melting point glass powder layer 5. The low melting point glass powder layer 5 fixes the degassing device 4 in groove 3.

After the step of evacuation of the evacuated glass panel vaporization activated by high frequency is performed in order to remove residual gas and increase degree of evacuation, creating thermo and sound insulating effect for the embodiment.

Moreover, because the low melting point glass powder has thermal conductivity far lower than that of glass, instantaneously heating the degassing device cannot break the glass, thereby increasing the yield of qualitatively finished product.

EXAMPLE 2

Figure 2:
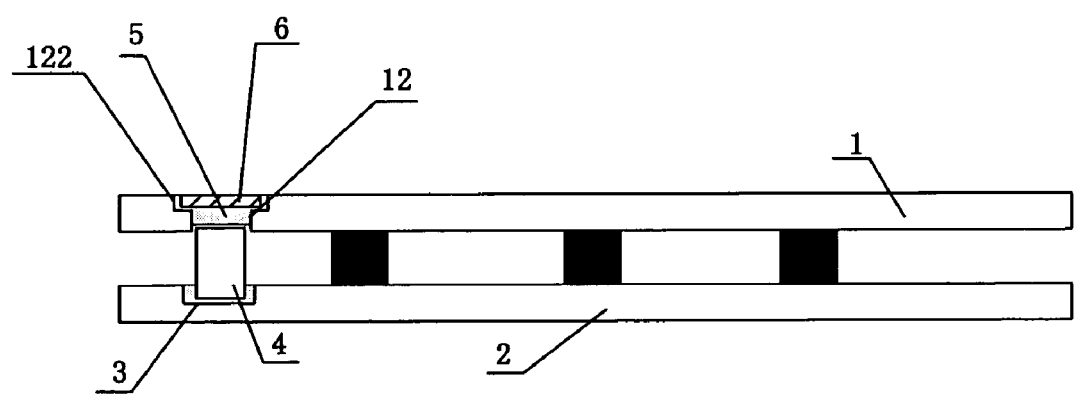
FIG. 2 is a schematic cross sectional view of another embodiment according to this invention.

As shown in FIG. 2, on the surface of the top planar glass sheet, an air discharge hole 12 for evacuation is opened. Around the periphery of the air discharge hole 12 a concave portion 122 is opened on the outer surface of the glass sheet. The concave portion 122 can receive a sealing piece 6 and the sealing piece 6 is fixed in the concave portion 122 through the low melting point glass powder layer 5 to close the air discharge hole 12 after evacuation of the evacuated glass panel.

The sealing piece has a thickness corresponding to the depth of the concave portion 122, thereby making the area around the surface of the air discharge hole 12 sufficiently even, and thus the problem of air leak can be avoided.

On the inner surface of bottom glass sheet 2 a groove 3 is opened for placing the degassing device 4, and the position of groove 3 is lined up with that of air discharge hole 12 on glass sheet 1.

In the present invention, the upper end of degassing device 3 can be inserted into air discharge hole 12. This makes it possible to form groove 3 rather shallow, and the mechanical strength of the evacuated glass panel is increased, thus suitable for production of evacuated glass panels having small thickness.

At last, it should be noted that above-mentioned embodiments are employed only for description of the technical schemes of the present invention and should not be deemed as limiting the scope of the invention. Although the present invention has been described in detail, it should be apparent to those of ordinary skill in the art that modifications and variations may be made without departing from the spirit and scope of the technical schemes of the present invention, and all those should be included within the scope of appended claims.

The invention claimed is:

1. An evacuated glass panel having a degassing device, comprising:
    at least two planar glass sheets;
    support means disposed between said at least two planar glass sheets;
    an edge frame component sealed around a periphery of said at least two planar glass sheets to form an evacuated space between said at least two planar glass sheets;
    two grooves formed on two opposite inner surfaces of said at least two planar glass sheets, said two grooves being aligned with each other;
    a degassing device placed between said two grooves within said evacuated space of said at least two planar glass sheets; and
    a low melting point glass powder layer disposed between said degassing device and at least one of said two grooves to fix and joint said degassing device.

2. The evacuated glass panel as claimed in claim 1, wherein said low melting point glass powder layer has a thermal conductivity smaller than the thermal conductivity of said at least two planar glass sheets.

3. The evacuated glass panel as claimed in claim 1, wherein said grooves have a square, circular or cone shape.

4. The evacuated glass panel as claimed in claim 1, wherein said low melting point glass powder layer is formed by sintering low melting point glass powders.

5. An evacuated glass panel having a degassing device, comprising:
    at least two planar glass sheets including a bottom planar glass sheet and a top planar glass sheet;
    support means disposed between said at least two planar glass sheets;
    an edge frame component sealed around a periphery of said at least two planar glass sheets to form an evacuated space between said at least two planar glass sheets;
    a groove formed on an inner surface of said bottom planar glass sheet;
    an air discharge hole formed through said top planar glass sheet, said air discharge hole being aligned with said groove and having a concave portion formed on an outer surface of said top planar glass sheet;

a degassing device placed in said air discharge hole and said groove within said evacuated space of said at least two planar glass sheets;

a low melting point glass powder layer disposed on said degassing device in said air discharge hole; and a sealing piece received in said concave portion over said low melting point glass powder layer, said sealing piece sealing and closing said air discharge hole;

wherein said degassing device is fixed in said air discharge hole and said groove, and jointed to said sealing piece by said low melting point glass powder layer.

6. The evacuated glass panel as claimed in claim 5, wherein said sealing piece has a thickness equal to the depth of said concave portion above said low melting point glass powder layer so as to close said air discharge hole to form an even surface for said evacuated glass panel.

7. The evacuated glass panel as claimed in claim 5, wherein said low melting point glass powder layer has a thermal conductivity smaller than the thermal conductivity of said at least two planar glass sheets.

8. The evacuated glass panel as claimed in claim 5, wherein said groove has a square, circular or cone shape.

9. The evacuated glass panel as claimed in claim 5, wherein said low melting point glass powder layer is formed by sintering low melting point glass powders.

* * * * *